United States Patent
Kuhn et al.

(10) Patent No.: US 7,716,724 B2
(45) Date of Patent: May 11, 2010

(54) EXTENSIBLE AUTHENTICATION PROTOCOL (EAP) STATE SERVER

(75) Inventors: Richard S. Kuhn, Dublin, OH (US); Matthew J. Gilbert, Columbus, OH (US); April L. Hoffman, Pataskala, OH (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1364 days.

(21) Appl. No.: 11/153,328

(22) Filed: Jun. 16, 2005

(65) Prior Publication Data

US 2006/0288406 A1 Dec. 21, 2006

(51) Int. Cl.
*G06F 7/04* (2006.01)
*G06F 21/00* (2006.01)
*G06F 9/00* (2006.01)

(52) U.S. Cl. .............................. 726/8; 713/186; 726/12
(58) Field of Classification Search .................... 726/8, 726/12; 713/168
See application file for complete search history.

(56) References Cited

U.S. PATENT DOCUMENTS

| 7,171,555 | B1 * | 1/2007 | Salowey et al. ............. 713/156 |
|---|---|---|---|
| 7,421,503 | B1 * | 9/2008 | Stieglitz et al. ............. 709/229 |
| 2003/0065919 | A1 * | 4/2003 | Albert et al. ................. 713/168 |
| 2004/0010713 | A1 | 1/2004 | Vollbrecht et al. .......... 713/201 |
| 2004/0019786 | A1 * | 1/2004 | Zorn et al. ................... 713/168 |
| 2004/0073793 | A1 * | 4/2004 | Takeda ........................ 713/168 |
| 2004/0103282 | A1 * | 5/2004 | Meier et al. ................. 713/171 |
| 2004/0153555 | A1 * | 8/2004 | Haverinen et al. .......... 709/229 |
| 2005/0163078 | A1 * | 7/2005 | Oba et al. .................... 370/331 |
| 2005/0228874 | A1 * | 10/2005 | Edgett et al. ................ 709/220 |
| 2005/0271209 | A1 * | 12/2005 | Sahasrabudhe et al. ..... 380/270 |
| 2006/0185001 | A1 * | 8/2006 | Stieglitz et al. ................ 726/4 |
| 2006/0236377 | A1 * | 10/2006 | Metke et al. ................... 726/4 |

OTHER PUBLICATIONS

Aboba et al., "Extensible Authentication Protocol (EAP)", Internet Engineering Task Force, Request for Comment 3748, Jun. 2004.
Simpson, "Point-to-Point Protocol", Internet Engineering Task Force, Request for Comment 1661, Jul. 1994.
"IEEE 802.1X: Port-Based Network Access Control", IEEE Computer Society, Dec. 13, 2004.

* cited by examiner

*Primary Examiner*—Techane J Gergiso

(57) ABSTRACT

A method and system that may include two or more authentication devices configured to authenticate a user via an authentication session. The method and system may also include a device operably coupled to the two or more authentication devices and being configured to manage the authentication session.

25 Claims, 3 Drawing Sheets

EXTENSIBLE AUTHENTICATION PROTOCOL (EAP) STATE SERVER

FIELD OF THE INVENTION

Implementations relate generally to computer network access management and, more particularly, to systems and methods for centralized access control to network resources.

BACKGROUND OF THE INVENTION

Extensible authentication protocol (EAP) is a general protocol for authentication that supports multiple authentication protocols as an extension to data link layers, such as the point-to-point protocol (PPP) or IEEE 802.1x, for example, without requiring IP, as described, for instance, in the Internet Engineering Task Force (IETF) publication, RFC-3748. EAP is a lock-step protocol that supports exchanges of single data packets. Thus, EAP cannot efficiently transport bulk data.

Many of the authentication methods supported by EAP accomplish authentication through an EAP session characterized by a sequential message conversation in which a multi-step exchange of successive EAP messages occurs between a peer and an authenticating entity (e.g., an authentication server) that terminates the EAP authentication method. EAP assumes ordering guarantees provided by the data link layer, thereby supporting in-order packet delivery and retransmission. Thus, a new request—other than the initial request—cannot be sent before receiving a valid response. A host receiving an EAP packet has three options: act on it, drop it, or forward it.

In some environments, a peer may gain access to the network through a network access server (NAS), to which two or more authentication servers are associated, for example, for redundancy and/or load balancing purposes. Currently, the peer is required to carry out the entire authentication conversation with a single authentication server to successfully negotiate an authentication method and subsequent authentication. That is, EAP sessions typically fail when a mid-conversation EAP packet is terminated at an authentication server that has not been privy to the ongoing EAP conversation. Because the NAS varyingly assigns a path of travel for EAP packets received from the peer, however, it is statistically unlikely that each of the EAP packets in an entire EAP conversation will terminate at the same authentication server; an unlikelihood that increases with the number of EAP packets in a given EAP conversation and with the number of associated authentication servers in a given network.

SUMMARY OF THE INVENTION

According to one aspect, a method may include receiving, by a state server, a first message of an extensible authentication protocol (EAP) session from a first authentication server; receiving, by the state server, a second message of the EAP session from a second authentication server; and managing, by the state server, the EAP session based on at least the first and second messages.

According to another aspect, a system may include two or more authentication devices configured to authenticate a user via an authentication session; and a device operably coupled to the two or more authentication devices and being configured to manage the authentication session.

According to yet another aspect, an EAP system may include means for managing an EAP session among a user device and associated EAP authenticators, based on state information of the EAP session; and means for authenticating the user device based on the state information.

According to yet another aspect, a method may include initiating, by a first of at least two associated servers having authenticating authority, an EAP session for a user device; and authenticating, by a second of the at least two associated servers, the user device via the EAP session.

BRIEF DESCRIPTION OF THE DRAWINGS

The accompanying drawings, which are incorporated in and constitute a part of this specification, illustrate an implementation of the invention and, together with the description, explain the invention. In the drawings.

DETAILED DESCRIPTION

The following detailed description of embodiments of the principles of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the principles of the invention may provide authentication services that permit any associated extensible authentication protocol (EAP)-supported authentication server in a network to accept an EAP-formatted message (hereinafter, "EAP message") at any point in an ongoing EAP session that is terminated at the other end by a user device. The accepted EAP message may then be forwarded to an EAP "state" service that maintains a state of the EAP conversation. The EAP state service may formulate an information message based on the state and send the information message to the forwarding EAP authentication server. The forwarding EAP authentication server may generate an EAP request based on the information message which is sent to the user device via the network through a network access device.

Exemplary Network

Figure 1:
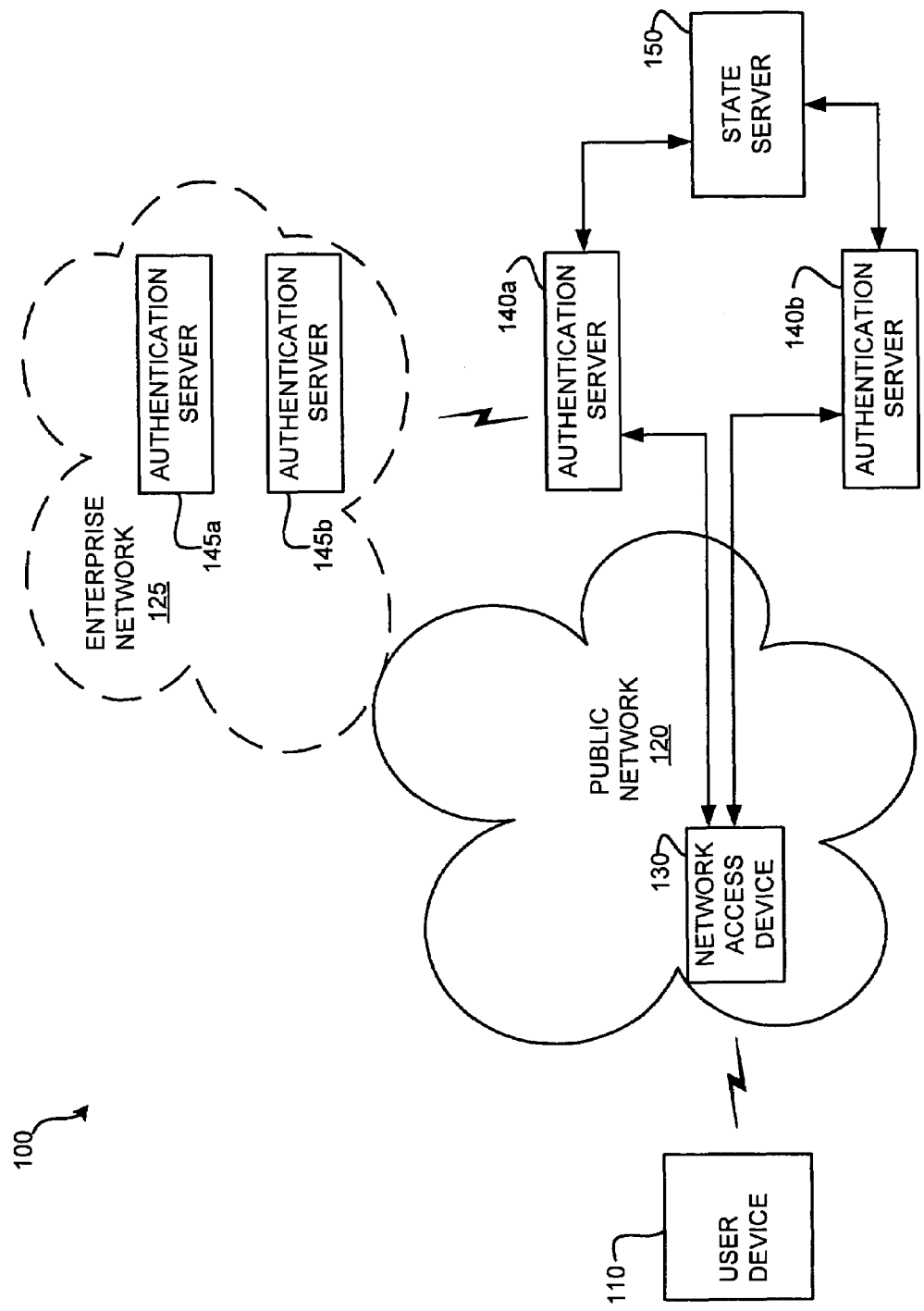
FIG. 1 is an exemplary diagram illustrating an exemplary network in which methods and systems consistent with the principles of the invention can be implemented.

FIG. 1 illustrates an exemplary network 100 in which systems and methods consistent with the principles of the invention may be implemented. As illustrated, exemplary network 100 may include a user device 110 that operatively connects with a public network 120 which may have an associated network access device 130. Exemplary network 100 may also include authentication servers 140*a* and 140*b* (collectively, authentication servers 140) that operatively connect to network access device 130 via network 120. Exemplary network 100 may also include a state server 150 that operatively connects to authentication servers 140. Exemplary network 100 may also include an enterprise network 125 that operatively connects to authentication servers 140. Enterprise network 125 may include authentication servers 145*a* and 145*b* (collectively, authentication servers 145).

The number and type of devices illustrated in FIG. 1 are provided for simplicity. In practice, a typical network in which the invention may be implemented could include more or fewer devices and/or networks than what is illustrated in FIG. 1. In addition, devices depicted as single entities may be implemented in a distributed arrangement.

In one implementation consistent with principles of the invention, user device 110 may include any client or host device capable of interacting with networked devices via a unique network identifier, such as a network address, for example, in a distributed environment. User device 110 may include one or more devices, such as a personal computer, a laptop, a personal digital assistant (PDA), or another type of computation or communication device capable of initiating, processing, transmitting, and/or receiving data and/or voice communications or other media via network 120. According to one implementation, user device 110 may be a remote user of enterprise network 125.

In one implementation, public network 120 may include a local area network (LAN), a wide area network (WAN), a public switched telephone network (PSTN), an intranet, the Internet, or a combination of similar or dissimilar networks. Public network 120 may include one or more network devices, such as a network access device 130 (e.g., a network access server (NAS)) and/or systems cooperatively operating to receive, send, and/or transport data or other media.

According to one implementation, user device 110 may be operated by a user to gain access to public network 120 using a link and network access device 130. A link may include, for example, a broadband connection, such as a digital subscriber line (DSL) connection provided over, for example, shielded twisted pair, a cable modem connection provided over, for example, coaxial cable and/or optical fiber, and/or a wireless connection provided over, for example, a wireless fidelity (Wi-Fi) link and/or free-space optical link.

Network access device 130 may include one or more devices that provide user device 110 with access to public network 120 and/or enterprise network 125. For example, network access device 130 may include a router, a network switch, an NAS, a firewall, a database, a gateway, a server, a network operations center (NOC), a translator, a certification authority, etc. In one implementation, network access device 130, as will be described in greater detail below, may authenticate a user associated with user device 110 in cooperation with authentication servers 140 and 145, and state server 150.

Authentication servers 140 and 145 may include one or more devices for authenticating user device 110. Authentication servers 140 and 145 may negotiate an EAP authentication type, and/or authenticate user device 110. In one implementation, authentication servers 140 may authenticate a user's access to public network 120 and authentication servers 145 may authenticate a user's access to enterprise network 125. Authentication servers 140 and 145 may be associated with one or more databases that store authentication information, such as, for example, user identifiers (IDs) and passwords.

In one implementation consistent with principles of the invention, authentication server 140a may act as an intermediary between public network 120 and enterprise network 125. For example, authentication server 140a may operatively function as both a client and a server for purposes of processing various network requests on behalf of user device 110. According to one implementation, authentication server 140a may include interpreting functionality, capable of rewriting a request message before forwarding the message to another device. Authentication server 140a may also include caching, administrative control (e.g., filtering), and/or security (e.g., firewall) functionality.

Enterprise network 125 may include a privately owned and possibly maintained network. For example, enterprise network 125 may include a company's private network.

State server 150 may include one or more devices for maintaining EAP session state information. State server 150 may connect to authentication servers 140/145 via any well-known technique, such as wired, wireless, and/or optical communications. In one implementation, state server 150 may communicate with authentication servers 140/145 using the Transmission Control Protocol (TCP), for example, to communicate information messages of the EAP session. While state server 150 and authentication servers 140/145 are shown as separate devices in FIG. 1, it will be appreciated that in other implementations, state server 150 and one or more authentication servers 140/145 may be implemented as a single device.

According to one implementation consistent with the principles of the invention, state server 150 may maintain or have access to information regarding specific types of EAP supported by respective authentication servers 140 and 145. State server 150 may be configured to implement any or all of the supported types of EAP. State server 150 may include encryption/decryption functionality.

Figure 2:
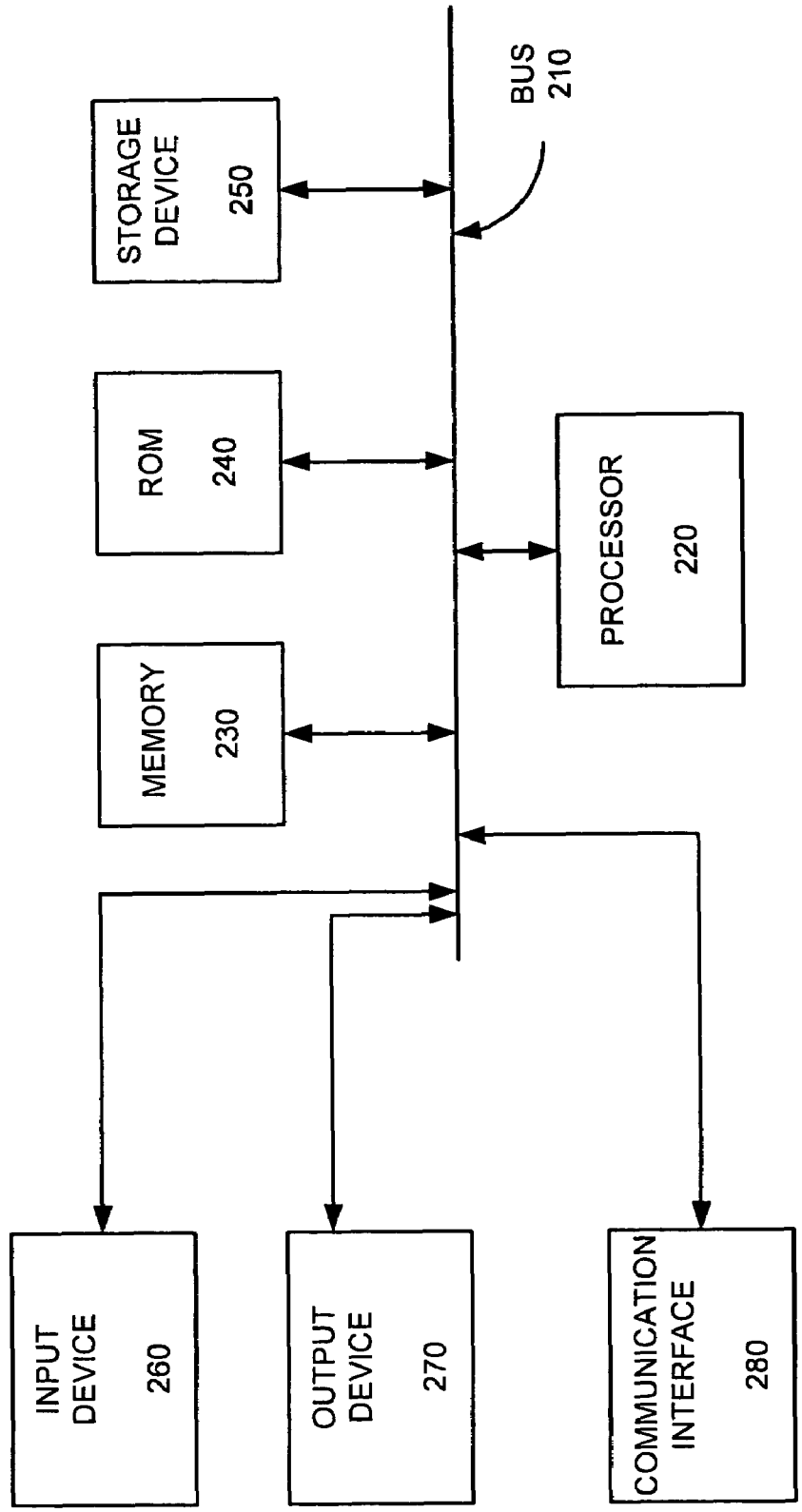
FIG. 2 is an exemplary block diagram of the state server of FIG. 1 according to an implementation consistent with the principles of the invention.

FIG. 2 illustrates an exemplary configuration of state server 150 in an implementation consistent with the principles of the invention. Other configurations may alternatively be used. User device 110, network access device 130, and authentication servers 140 and 145 may be similarly configured. As illustrated, state server 150 may include a bus 210, a processor 220, a memory 230, a read only memory (ROM) 240, a storage device 250, an input device 260, an output device 270, and a communication interface 280. Bus 210 permits communication among components of state server 150.

Processor 220 may include any type of conventional processor, microprocessor, or processing logic that interprets and executes instructions. Memory 230 may include a random access memory (RAM) or another type of dynamic storage device that may store information and instructions for execution by processor 220. Memory 230 may also be used to store temporary variables or other intermediate information during execution of instructions by processor 220.

ROM 240 may include a conventional ROM device and/or another type of static storage device that may store static information and instructions for processor 220. Storage device 250 may include a magnetic disk or optical disk and its corresponding drive and/or some other type of magnetic or optical recording medium and its corresponding drive for storing information and instructions.

Input device 260 may include one or more conventional mechanisms that permit an operator to input information to state server 150, such as a keyboard, a mouse, a pen, voice recognition and/or biometric mechanisms, etc. Output device 270 may include one or more conventional mechanisms that output information to the operator, including a display, a printer, one or more speakers, etc. Communication interface 280 may include any transceiver-like mechanism that enables state server 150 to communicate with other devices and/or systems. For example, communication interface 280 may include a modem or an Ethernet interface to a LAN. Alternatively, communication interface 280 may include other mechanisms for communicating via a network.

Exemplary Processing

As used herein, EAP may include any variant of EAP, e.g., message digest (MD) 5-challenge, protected EAP (PEAP), EAP-transport layer security (EAP-TLS), EAP-tunneled TLS (EAP-TTLS), lightweight EAP (LEAP), and the like. Authentication may be accomplished through the presentation of valid authentication information for a user device, such as a valid identity (ID) and password.

Assume, for explanatory purposes, that during a link establishment phase occurring between user device 110 and network access device 130, an authentication-protocol configuration option may be selected, in which case, network access device 130 communicates a need for EAP authentication for user device 110 (i.e., the authenticatee) to authentication server 140*a* (i.e., the authenticator). Authentication server 140a formulates one or more requests that are sent to network access device 130. The request may include a state attribute that identifies authentication server 140*a*. The request may also include a request to identify user device 110. In those situations in which the identity of user device 110 can be determined independently, for example, by the port to which user device 110 is connected (e.g., leased lines, dedicated switch, or dial-up ports, etc.), or other technique (e.g., media access control (MAC) address, etc.), the request to identify user device 110 may not be included. A challenge may also include information identifying the type of EAP authentication, e.g., EAP-TLS, PEAP, LEAP, etc, to be used.

Network access device 130 forwards the request to user device 110 and receives a response in reply, which is then forwarded, based on the state attribute, to authentication server 140*a*. Authentication server 140*a* may send a subsequent request, as appropriate. The exchange of requests and responses may continue as long as is necessary to select an appropriate EAP authentication protocol to be used for subsequently authenticating user device 110. Alternatively, the request may be dropped if the negotiation of the type of EAP to be used in authentication is unsuccessful.

Figure 3:
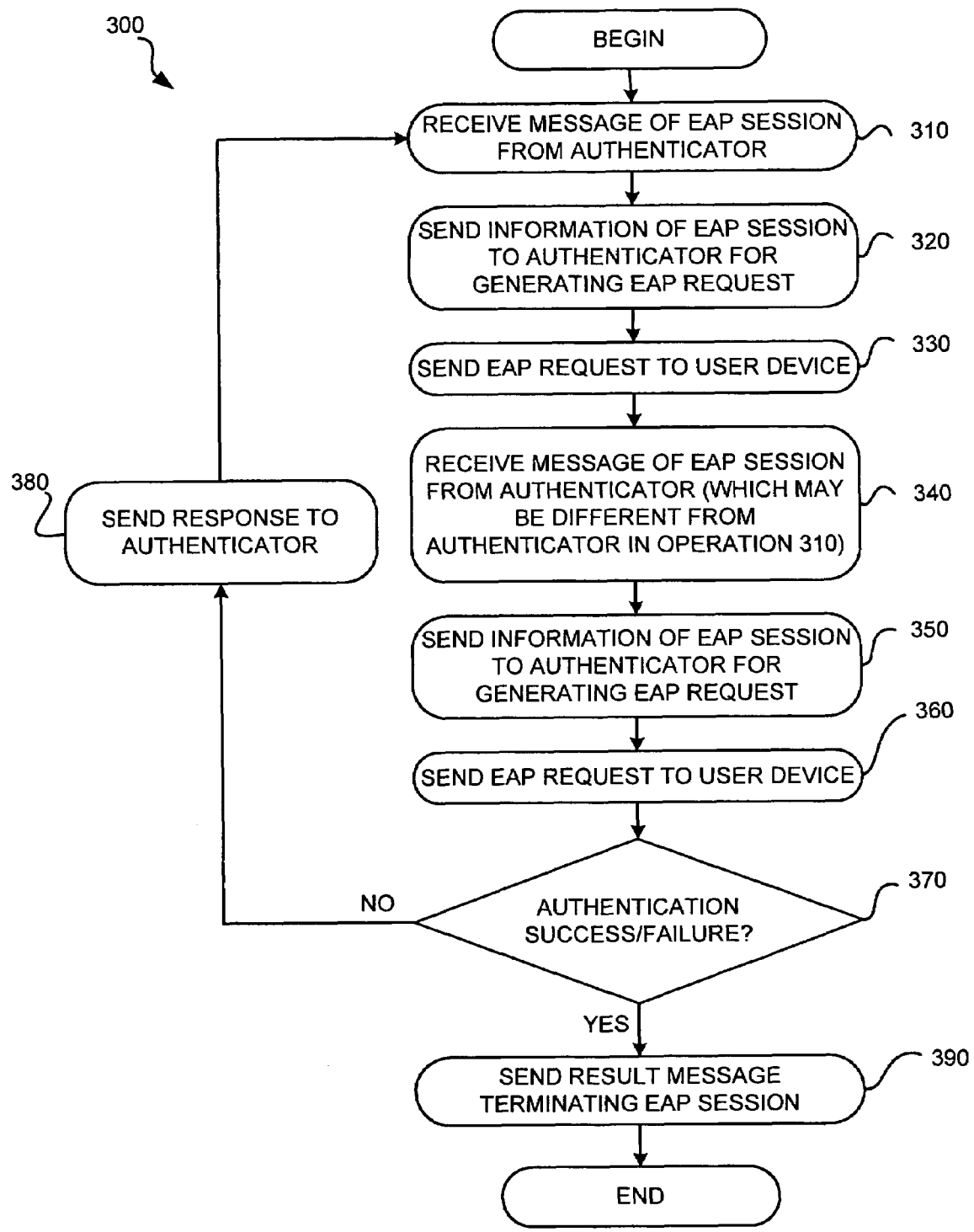
FIG. 3 is an exemplary flow diagram illustrating a method for providing authentication consistent with the principles of the invention.

FIG. 3 is a flowchart of exemplary processing for authenticating user device 110 according to an implementation consistent with principles of the invention. Upon successful negotiation of the type of EAP authentication to be used in authenticating user device 110, as discussed above, an authentication phase 300 begins, in which authentication server 140*a* forwards the received opening EAP message and/or a data message (e.g., using TCP) relating to the opening EAP message that includes at least some of the information communicated during negotiation of the type of EAP to be used (e.g., EAP type, user device identification information, etc.), to state server 150, to thereby track an EAP session for user device 110 (operation 310).

It will be appreciated that in the following discussion of the EAP session, that the contents of the EAP messages are specific to the type of EAP used in the EAP session, and thus the EAP messages themselves may include information consistent with any of the known EAP types, which is not discussed in detail herein. For purposes of some implementations consistent with the principles of the invention, the EAP session may involve a multi-step message exchange. The information included in the EAP messages in the exchange may not specify the particular authentication server 140*a*/ 140*b* that forwarded the opening EAP message. However, it should be understood that for EAP sessions in which an EAP type is used for which only one EAP exchange is necessary (e.g., MD5-challenge, one-time passwords, etc.), or in other cases in which maintaining state information is not desired, state server 150 may be passively involved in the EAP authentication.

State server 150 may store the forwarded EAP message and/or data message and/or information regarding the EAP message as state information (e.g., message contents, sequential numbering of message, etc.). In situations in which the forwarded EAP message is encrypted, state server 150 may in some implementations consistent with the principles of the invention, decrypt the EAP message and forward the decrypted message back to authentication server 140*a*. State server 150 may generate a request based on the decrypted EAP message, for example, based on authentication information for user device 110. State server 150 may obtain the authentication information from communications with an authenticating authority (not shown) any time before or during the EAP session, which may then be stored by state server 150. For example, the authenticating authority may be a third-party certificate authority that issues digital certificates, and the like, to create digital certificates and public-private key pairs, etc. As another example, the authenticating authority may be a third-party entity having associated token cards. State server 150 may formulate an information message and send the information message to authentication server 140*a* for generating an EAP request (operation 320), for example.

Authentication server 140*a* may receive the information message from state server 150, generate an EAP request, and forward the EAP request to network access device 130 (operation 330). The EAP request may not include information identifying authentication server 140*a* as the source of the EAP request. Network access device 130 may forward the EAP request to user device 110.

User device 110 may send an EAP response in reply to the EAP request to network access device 130. Since the EAP request did not receive information identifying authentication server 140*a*, the EAP response received by network access device 130 will not identify authentication server 140*a* as the intended recipient of the EAP response. In the absence of such routing information, network access device 130 may varyingly send the EAP response to either of the authentication servers 140. Should authentication server 140*b* receive the EAP response, it may forward the EAP response and/or a data message relating to the EAP response to state server 150 (as opposed to simply dropping the EAP response as a result of not having been privy to the ongoing EAP session initiated by authentication server 140*a*). Should authentication server 140*a* receive the EAP response, it may likewise forward the EAP response and/or a data message relating to the EAP response to state server 150. In either event, state server 150 may receive the EAP response and/or the data message regarding the EAP response from user device 110 (operation 340).

State server 150 may store the forwarded EAP response and/or the data message and/or information regarding the EAP message, the previously received EAP message, the transmitted EAP request, and/or the state information, based on the type of EAP being used in the EAP session. State server 150 may store the information as updated state information for the ongoing EAP session. State server 150 may generate a follow-up information message to the EAP response based on the EAP response contents, the updated state information, the previously received EAP message, authentication information for user device 110, or on any combination thereof. State server 150 may send the follow-up information message, for example, as a follow-up EAP request, to whichever of authentication server 140*a* or 140*b* forwarded the EAP response and/or data message (operation 350). Again, based on the type of EAP being used in the EAP session, state server 150, authentication servers 140, or both, may determine authentication success or failure based on the forwarded EAP response, the previously received EAP message, the transmitted EAP request, and/or the stored state information (operation 370).

Authentication server 140a or 140b, as appropriate, may receive the follow-up information message from state server 150, and generate a follow-up EAP request based on the follow-up information and the type of EAP being used in the EAP session. Authentication server 140a or 140b may send the follow-up EAP request to network access device 130. Again, the follow-up EAP request may not identify which of authentication servers 140 transmitted the follow-up EAP request. Network access device 130 may forward the follow-up EAP request to user device 110 which may cause another EAP response to be sent to authentication servers 140 (operation 380).

The above authentication process, i.e., operations 310-380, may continue with any desired number of successive EAP message exchanges, based on the type of EAP being used in the EAP session, and may involve an equal number of (or fewer) authentication servers 140. In this manner, and consistent with the principles of the invention, state server 150 keeps track of the state of the EAP session. The EAP authentication session may close when authentication of user device 110 either fails or succeeds, based on the type of EAP being used in the EAP session, as indicated in an final result message sent from state server 150 to authentication servers 140 and to network access device 130 (operation 390).

According to one implementation, state server 150 may be configured to provide the above-described authentication services (or other services) to more than one EAP session concurrently.

According to another implementation consistent with principles of the invention, user device 110 may be a remote user requesting access to enterprise network 125. Authentication of user device 110 as a remote user may be accomplished substantially as discussed above, with the following variation. Other variations are possible.

Authentication servers 145 (e.g., customer-hosted authentication servers) may operatively authenticate user device 110 in those situations in which user device 110 desires access to access-limited resources of public network 120. Accordingly, authentication server 140a may function substantially as a "pass-through" or proxy server, through which the EAP messages (e.g., responses and requests) are conveyed. According to one implementation, state server 150 may store information regarding which of authentication servers 145 are responsible for terminating the EAP session, for example, from stored information regarding a previously established connection for user device 110 to enterprise network 125 via public network 120. State server 150 may thus communicate to authentication server 140a, for example, which of authentication servers 145 initiated the negotiation of the EAP authentication type.

According to one implementation consistent with principles of the invention, state server 150 may be configured to "listen" on a network port for data messages received by authentication servers 140. State server 150 may listen on the port for TCP connections, for example. Authentication servers 140 may respectively connect to the port and then send a message to state server 150 requesting connectivity. State server 150 may reply to the appropriate authentication server 140 to track the EAP session.

According to another exemplary implementation for providing authentication service, exemplary network 100 may include an additional one, two, three, or more state servers (not shown) that may be configured to associate with and function substantially similar to state server 150 (e.g., operate in a back-up, fail-safe, and/or redundant configuration). In one implementation, state server 150 may provide state information to the associated state server(s). In another implementation, authentication servers 140 and/or the associated state server(s) may be configured to determine an availability—or unavailability—of state server 150 to receive EAP messages.

For example, a specific state server 150 (from a group of associated state servers 150) for communicating an EAP message may be determined from information in the state attribute of the packet containing the EAP message. In which case, if the identified state server 150 is unavailable, the EAP session may be closed. If, however, the EAP message does not specify a specific state server 150, authentication servers 140 may select any specific state server 150 from among the associated state servers 150 for receipt of the EAP message. The state server 150 selection process may be repeated as many times as necessary to find an available state server 150. Accordingly, authentication services functionality may be transferred among one or more associated state servers, for example, any time before and/or during an EAP session.

According to one implementation, state server 150 may be configured to include a "session timeout." For example, each EAP session managed by state server 150 may be maintained for a limited time (e.g., two minutes), for example, as specified in the EAP message. After which time, state server 150 may delete the state information for the EAP session, and any subsequent EAP messages for the "timed-out" EAP session may be returned with status of "reject."

CONCLUSION

Implementations consistent with principles of the invention provide for enhanced EAP authentication by maintaining state information for an EAP session. Implementations may provide a centralized EAP management point in a network to thereby advantageously obviate the need to modify existing network elements (e.g., network access servers, etc.) to resolve routing issues in networks in which more than one authentication server is present. Accordingly, EAP authenticator systems consistent with principles of the invention provide substantially improved authentication over typical authentication processes.

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

For example, while a series of operations has been disclosed with regard to FIG. 3, the order of the operations may be varied in other implementations consistent with principles of the invention. Furthermore, non-dependent operations may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. Such logic may include hardware, such as an application specific integrated circuit (ASIC) or a field programmable gate array, software, or a combination of hardware and software. While aspects have been described in terms of processing messages or packets, such aspects may operate upon any type or form of data, including packet data and non-packet data. The term "data unit" may refer to packet or non-packet data.

No element, operation, or instruction used in description of the present invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A method for maintaining state information for an extensible authentication protocol (EAP) session, comprising:
   receiving, by a state server, a first message of the EAP session from a first authentication server;
   receiving, by the state server, a second message of the EAP session from a second authentication server; and
   managing, by the state server, the EAP session based on at least the first and second messages, including:
      sending a reply to the first message, from the state server to the first authentication server;
      storing, by the state server, information relating to at least one of the first message or the reply to the first message as state information;
      sending a reply to the second message, from the state server to the second authentication server based on the state information;
      maintaining the EAP session for a predetermined time; and
      closing the EAP session after the predetermined time, where the state server and the first and second authentication servers are separate devices configured to communicate via at least one of a wired, a wireless, or an optical connection.

2. The method of claim 1, where the managing further comprises:
   storing information relating to the first and second messages, the information being based on a type of the EAP session.

3. The method of claim 1, where the first message is an encrypted message, the method further comprising:
   decrypting, by the state server, the encrypted message.

4. A method for maintaining state information for an extensible authentication protocol (EAR) session, comprising:
   receiving, by a state server, a first message of the EAP session from a first authentication server;
   receiving, by the state server, a second message of the EAP session from a second authentication server;
   managing, by the state server, the EAP session based on at least the first and second messages;
   storing, by the state server, information relating to the first and second messages as state information;
   providing, by the state server, the state information to at least one other state server; and
   redirecting, when the state server is unavailable to receive at least one subsequent message, the at least one subsequent message of the EAP session to the at least one other state server, where the state servers and the first and second authentication servers are separate devices configured to communicate via at least one of a wired, a wireless, or an optical connection.

5. The method of claim 4, further comprising:
   formulating, by the at least one other state server, a reply to the at least one subsequent message based on the provided state information.

6. The method of claim 5, further comprising:
   revising, by the at least one other state server, the provided state information based on the at least one subsequent message and the reply; and
   providing, by the at least one other state server, the revised state information to the state server.

7. The method of claim 1 further comprising:
   managing, by the state server, at least one other EAP session while managing the EAP session.

8. A system comprising:
   two or more authentication devices to authenticate a user via an extensible authentication protocol (EAP) session;
   a device, coupled to the two or more authentication devices, to manage the EAP session by:
      maintaining a state of the EAP session;
      formulating requests to messages received, based on the state of the EAP session; and
      selectively sending the respective requests to authentication devices of the two or more authentication devices from which the EAP packets are received; and
   a backup device, coupled to the device and the two or more authentication devices, to:
      receive information of a state of the extensible authentication protocol session from the two or more authentication devices, and
      store the state information from the EAP session, where the device, the backup device, and the two or more authentication device are separate devices configured to communicate via at least one of a wired, a wireless, or an optical connection.

9. The system of claim 8, where the two or more authentication devices are further to forward messages received via the EAP session to the device.

10. The system of claim 8, where the device is further to:
    revise the state information based on the received EAP packets and the respective requests.

11. The system of claim 8, where, when managing the EAP session, the device is to:
    store information relating to the EAP session, the information being based on a type of the EAP session.

12. The system of claim 8, where the backup device is further to:
    monitor the two or more authentication devices to determine an unavailability of the device to receive messages via the EAP session.

13. The system of claim 8, where the backup device is further to:
    revise the state information, and provide the revised state information to the device.

14. The system of claim 8, where, when managing the EAP session, the device is to:
    track a duration of the EAP session, and
    close the EAP session when the duration exceeds a limit.

15. The system of claim 8, where the EAP session comprises a protected EAP (PEAP) session.

16. The system of claim 8, where the EAP session comprises an EAP-transport layer security (EAP-TLS) session.

17. The system of claim 8, where the EAP session comprises an EAP-tunneled TLS (EAP-TTLS) session.

18. The system of claim 8, where the EAP session comprises a lightweight EAP (LEAP) session.

19. A method for maintaining state information for an extensible authentication protocol (EAR) session, comprising:
- initiating, by a first of at least two associated servers having authenticating authority, the EAP session for a user device;
- authenticating, by a second of the at least two associated servers, the user device via the EAP session;
- maintaining, by a state device associated with the first and second associated servers, state information of the EAP session based on EAP messages received at the state device from the first and second associated servers;
- managing, by the state device, the EAP session based on the state information;
- providing the state information to one or more of the first and second associated servers;
- receiving, by the state device, a first message of the EAP session from the first associated server; and
- receiving, by the state device, a second message of the EAP session from the second associated server, where managing the EAP session based on the state information comprises:
  - sending, responsive to the first message, a first reply message from the state device to the first associated server,
  - storing, by the state device, information relating to at least one of the first message or the first reply message as the state information, and
  - sending, based on the state information and responsive to the second message, a second reply message from the state device to the second associated server, where the state device and the at least two associated server are separate devices configured to communicate via at least one of a wired, a wireless, or an optical connection.

20. The method of claim 19, where the at least two associated servers varyingly receive EAP messages via the EAP session.

21. The method of claim 19, further comprising:
determining, before the managing, an availability of the state device to manage the EAP session.

22. The method of claim 19, where the EAP session comprises a protected EAP (PEAP) session.

23. The method of claim 19, where the EAP session comprises an EAP-transport layer security (EAP-TLS) session.

24. The method of claim 19, where the EAP session comprises an EAP-tunneled TLS (EAP-TTLS) session.

25. The method of claim 19, where the EAP session comprises a lightweight EAP (LEAP) session.

* * * * *